United States Patent
Birand et al.

(10) Patent No.: US 10,387,874 B1
(45) Date of Patent: Aug. 20, 2019

(54) MOBILE TRANSACTIONS WITH MERCHANT IDENTIFICATION CODES

(71) Applicant: GOOGLE INC., Mountain View, CA (US)

(72) Inventors: Gulay Birand, Seattle, WA (US); Srinivas Visvanathan, Redmont, WA (US); Arvind Jayasundar, Redmond, WA (US); Hugh Vidos, Sammamish, WA (US)

(73) Assignee: GOOGLE LLC, Mountain View, CA (US)

(*) Notice: Subject to any disclaimer, the term of this patent is extended or adjusted under 35 U.S.C. 154(b) by 188 days.

(21) Appl. No.: 13/906,315

(22) Filed: May 30, 2013

(51) Int. Cl.
*G06Q 40/00* (2012.01)
*G06Q 20/38* (2012.01)

(52) U.S. Cl.
CPC .......... *G06Q 20/385* (2013.01); *G06Q 40/00* (2013.01)

(58) Field of Classification Search
CPC ......... G06Q 40/00; G06Q 40/04; G06F 17/60
See application file for complete search history.

(56) References Cited

U.S. PATENT DOCUMENTS

| | | |
|---|---|---|
| 6,112,984 A | 9/2000 | Snavely |
| 6,195,541 B1 | 2/2001 | Griffith |
| 6,920,474 B2 | 7/2005 | Walsh et al. |
| 7,596,529 B2 | 9/2009 | Mascavage, III et al. |
| 8,041,588 B2 | 10/2011 | Gilbert et al. |
| 8,132,720 B2 * | 3/2012 | Dyor ...................... G06Q 20/04 235/380 |
| 8,195,576 B1 | 6/2012 | Grigg et al. |

(Continued)

FOREIGN PATENT DOCUMENTS

| | | |
|---|---|---|
| CN | 101329712 A | 12/2008 |
| WO | WO 2008/030513 A2 | 3/2008 |

(Continued)

OTHER PUBLICATIONS

Sunil Gupta, The Mobile Banking and Payment Revolution, 2013, The European Financial Review, web, 3-6 (Year: 2013).*

(Continued)

*Primary Examiner* — I Jung Liu
(74) *Attorney, Agent, or Firm* — Johnson, Marcou & Isaacs, LLC

(57) ABSTRACT

A merchant creates a record with a payment processor. As part of the record, the payment processor records identification codes for one or more merchant operators of the merchant system. The merchant operator, such as a vendor, presents their identification code to a user that desires to purchase a product from the vendor. The user's computing device receives the vendor's identification code, as well as transaction details for the desired purchase transaction. The payment processor receives a request from the user's computing device to process the purchase transaction. Based on the identification code received and the transaction details, the payment processor identifies the merchant record and verifies a financial account for the user. The payment processor provides an authentication to the user computer device, which includes an authorization indicator, such as a vendor password. After the vendor views the authorization indicator, the vendor can provide the product to the user.

18 Claims, 4 Drawing Sheets

(56) References Cited

U.S. PATENT DOCUMENTS

| | | | |
|---|---|---|---|
| 8,204,949 | B1 | 6/2012 | Krajec |
| 8,301,566 | B2* | 10/2012 | Mears .................... G06Q 40/02 |
| | | | 705/38 |
| 8,805,746 | B2 | 8/2014 | Hoffman et al. |
| 2002/0026630 | A1 | 2/2002 | Schmidt et al. |
| 2002/0161724 | A1 | 10/2002 | Peters |
| 2003/0023473 | A1 | 1/2003 | Guyan et al. |
| 2003/0036994 | A1 | 2/2003 | Witzig et al. |
| 2003/0101137 | A1 | 5/2003 | Wronski, Jr. |
| 2003/0126076 | A1* | 7/2003 | Kwok et al. .................... 705/40 |
| 2004/0117358 | A1 | 6/2004 | Von Kaenel et al. |
| 2005/0075985 | A1* | 4/2005 | Cartmell ................ G06Q 20/04 |
| | | | 705/67 |
| 2005/0097015 | A1 | 5/2005 | Wilkes et al. |
| 2006/0010418 | A1 | 1/2006 | Gupta et al. |
| 2006/0144925 | A1 | 7/2006 | Jones |
| 2006/0235758 | A1 | 10/2006 | Schleicher |
| 2007/0038494 | A1 | 2/2007 | Kreitzberg et al. |
| 2007/0100669 | A1 | 5/2007 | Wargin et al. |
| 2007/0150413 | A1 | 6/2007 | Morgenstern |
| 2007/0203836 | A1 | 8/2007 | Dodin |
| 2007/0255652 | A1 | 11/2007 | Tumminaro et al. |
| 2007/0255653 | A1 | 11/2007 | Tumminaro et al. |
| 2008/0177668 | A1 | 7/2008 | Delean |
| 2008/0288400 | A1 | 11/2008 | Panthaki et al. |
| 2009/0182630 | A1 | 7/2009 | Otto et al. |
| 2009/0281865 | A1 | 11/2009 | Stoitsev |
| 2010/0063874 | A1 | 3/2010 | Keithley et al. |
| 2010/0078471 | A1 | 4/2010 | Lin et al. |
| 2010/0078472 | A1 | 4/2010 | Lin et al. |
| 2010/0082481 | A1 | 4/2010 | Lin et al. |
| 2010/0131347 | A1 | 5/2010 | Sartipi |
| 2010/0235275 | A1 | 9/2010 | Ansley |
| 2010/0257102 | A1 | 10/2010 | Perlman |
| 2010/0280914 | A1 | 11/2010 | Carlson |
| 2010/0293093 | A1 | 11/2010 | Karpenko |
| 2010/0332402 | A1 | 12/2010 | Kantarjiev et al. |
| 2011/0106710 | A1 | 5/2011 | Reed et al. |
| 2011/0196791 | A1 | 8/2011 | Dominguez |
| 2011/0320345 | A1 | 12/2011 | Taveau et al. |
| 2012/0036073 | A1 | 2/2012 | Basu et al. |
| 2012/0047071 | A1 | 2/2012 | Mullen et al. |
| 2012/0316963 | A1 | 12/2012 | Moshfeghi |
| 2013/0013353 | A1 | 1/2013 | Fisher |
| 2013/0226796 | A1 | 8/2013 | Jiang et al. |
| 2014/0040130 | A1 | 2/2014 | Kunz et al. |
| 2014/0095385 | A1 | 4/2014 | Ainslie et al. |
| 2016/0132859 | A1 | 5/2016 | Green et al. |
| 2016/0180317 | A1 | 6/2016 | Cozens et al. |

FOREIGN PATENT DOCUMENTS

| | | | |
|---|---|---|---|
| WO | WO 2010/102193 | A1 | 9/2010 |
| WO | WO 2010/102269 | A1 | 9/2010 |
| WO | 2012106655 | A2 | 8/2012 |
| WO | 2014/052970 | A1 | 4/2014 |

OTHER PUBLICATIONS

U.S. Appl. No. 13/436,819 to Crawley et al. filed Mar. 30, 2012.
U.S. Appl. No. 13/631,797 to Ainslie et al. filed Sep. 28, 2012.
U.S. Appl. No. 13/794,754 to Cozens et al. filed Mar. 11, 2013.

Author: Barber, J. Title: Labview: An Implementation of Data Flow Programming in a Graphical Language Publ: *Advances in Instrumentation and Control* vol./Iss:44 Part 3 pp. 1259-1261 Date: Jan. 1, 1989.
Author: Crawley, T. Title: Office Action issued in co-pending U.S. Appl. No. 13/436,819, filed Mar. 30, 2012 Publ: vol./Iss: pp. 1-11 dated Dec. 20, 2012.
Author: Crawley, T. Title: Office Action issued in co-pending U.S. Appl. No. 13/436,819, filed Mar. 30, 2012 Publ: vol./Iss: pp. 1-10 dated May 30, 2012.
Author: Kozuka, K. Title: Component-Based Visual Programming Environment for Cooperative Software Development Publ: *Hitachi Review* vol./Iss:45 pp. 75-80 Date: Apr. 1, 1996.
Author: Nguyen, L P. Title: Office Action issued in copending U.S. Appl. No. 13/631,797, filed Sep. 28, 2012 Publ: vol./Iss: pp. 1-21 dated May 24, 2013.
Author: Stambor, Z. Title: Home Depot Plans to Accept PayPal in All Stores Publ: retrieved from http://www.internetretailer.com/2012/01/25/home-depot-plans-accept- vol./Iss: Pages: Date: Jan. 25, 2012.
Kang, "Office Action issued in copending U.S. Appl. No. 13/794,754, filed Mar. 11, 2013", dated Oct. 1, 2014, 1-13.
Nguyen, "Office Action issued in co-pending U.S. Appl. No. 13/631,797, filed Sep. 28, 2012", dated Dec. 31, 2014, 1-34.
Kang, "Office Action issued in copending U.S. Appl. No. 13/794,754, filed Mar. 11, 2013", dated Dec. 24, 2013, 1-8.
Nguyen, "Office Action issued in copending U.S. Appl. No. 13/631,797, filed Sep. 28, 2012", dated Jan. 28, 2014, 1-23.
Oh, "International Search Report and Written Opinion issued in Appl. No. PCT/US2013/062689", dated Jan. 10, 2014, 1-12.
Crawley, "U.S. Office Action issued in copending U.S. Appl. No. 13/436,819, filed Mar. 30, 2012", dated Feb. 8, 2017, 19 pages.
Pastore, "European Office Action issued in European Application No. 13842814.9", dated Oct. 18, 2016, 4 pages.
Nguyen, "Office Action issued in copending U.S. Appl. No. 13/631,797, filed Sep. 28, 2012", dated Jul. 9, 2015, 1-28.
Pastore, "Extended European Search Report issued in European Application No. 13842814.9", dated Feb. 2, 216, 1-9.
De Man, "International Search Report and Written Opinion issued in International Application No. PCT/US2010/026453", dated Aug. 20, 2010, 14 pages.
Kang, "U.S. Office Action issued in copending U.S. Appl. No. 13/794,754, filed Mar. 11, 2013", dated May 31, 2016, 18 pages.
Moon, "International Preliminary Report on Patentability issued in International Application No. PCT/US2013/062689", dated Apr. 9, 2015, 9 pages,
Nguyen, "U.S. Office Action issued in copending U.S. Appl. No. 13/631,797, filed Sep. 28, 2012", dated Mar. 9, 2016, 29 pages.
Crawley, "U.S. Office Action issued in copending U.S. Appl. No. 13/436,819, filed Mar. 30, 2012", dated Aug. 10, 2017, 23 pages.
Kang, "U.S. Office Action issued in copending U.S. Appl. No. 13/794,754, filed Mar. 11, 2013", dated May 3, 2017, 19 pages.
Rui Na "Chinese Office Action issued in Chinese Application No. 201380061366.3", dated Apr. 19, 2017, 18 pages of English Translation and 11 pages of Chinese Office Action.
"Chinese Office Action issued in Chinese Application No. 201380061366.3", dated Feb. 12, 2018, 23 pages of English Translation and 14 pages of Chinese Office Action.
Kang "U.S. Office Action issued in copending U.S. Appl. No. 13/794,754, filed Mar. 11, 2013", dated Feb. 11, 2019, 18 pages.
"Chinese Office Action issued in Chinese Application No. 201380061366.3", dated Dec. 3, 2018, 17 pages of English Translation and 15 pages of Chinese Office Action.

* cited by examiner

# MOBILE TRANSACTIONS WITH MERCHANT IDENTIFICATION CODES

TECHNICAL FIELD

The present disclosure relates generally to mobile transactions, and more particularly to conducting mobile transactions with a merchant identification code.

BACKGROUND

Mobile computing device users often conduct payment transactions with their mobile computing device at physical merchant locations. To receive information about the user, such as user payment information, the merchant system must employ a computing device capable of communicating with the user's mobile computing device. The merchant system must further communicate the transaction information to a payment processing system, such as a credit card network, digital wallet provider, or other financial transaction system.

Some merchant systems require vendors or other merchant operators to be mobile. For example, a food vendor at a sporting or music venue may conduct purchase transactions while moving about the venue. In another example, a vendor may sell items door-to-door and desire to conduct transactions at the location of the user. Because of the needed mobility, conventional merchant systems require the vendor to carry a computing device to conduct the purchase transaction with the user. Yet carrying such a device can be costly for vendors. A vendor may have to purchase a mobile phone and any associated transaction processing hardware, for example, to conduct purchase transactions for the merchant system. For some vendors, purchasing such items may be cost prohibitive.

SUMMARY

In certain example aspects described herein, a computer-implemented method for a mobile transaction is provided. A payment processing system associates a merchant financial account and a merchant system identification code with a merchant system account. The payment processing system then receives a purchase transaction request from a user computing device associated with a user, such as a consumer. The request comprises a transaction amount for the purchase transaction, the merchant system identification code, and an identification of the user. Based on the merchant system identification code received in the transaction request, the payment processing system can determine a merchant record and the merchant financial account associated therewith. And, based on the identification of the user received in the transaction request, the payment processing system can determine a record of the user and a user financial account associated therewith. The payment processing system then determines whether to authorize the purchase transaction between the user financial account and the merchant financial account. Once the payment processing system authorizes the purchase transaction, the payment processing system notifies the user computing device that the purchase transaction has been authorized. As part of the notification, for example, the payment processing system can also provide an authorization indicator to the user computing device for the user to display to the merchant system operator. The authorization indicator comprises information confirming the authorization of the transaction. After viewing the authorization indicator, the merchant system operator, such as a merchant vendor, can provide a product to the user.

In certain other example aspects, a system for conducting a mobile transaction is described herein. Also provided in certain aspects is a computer program product for conducting a mobile transaction.

These and other aspects, objects, features and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
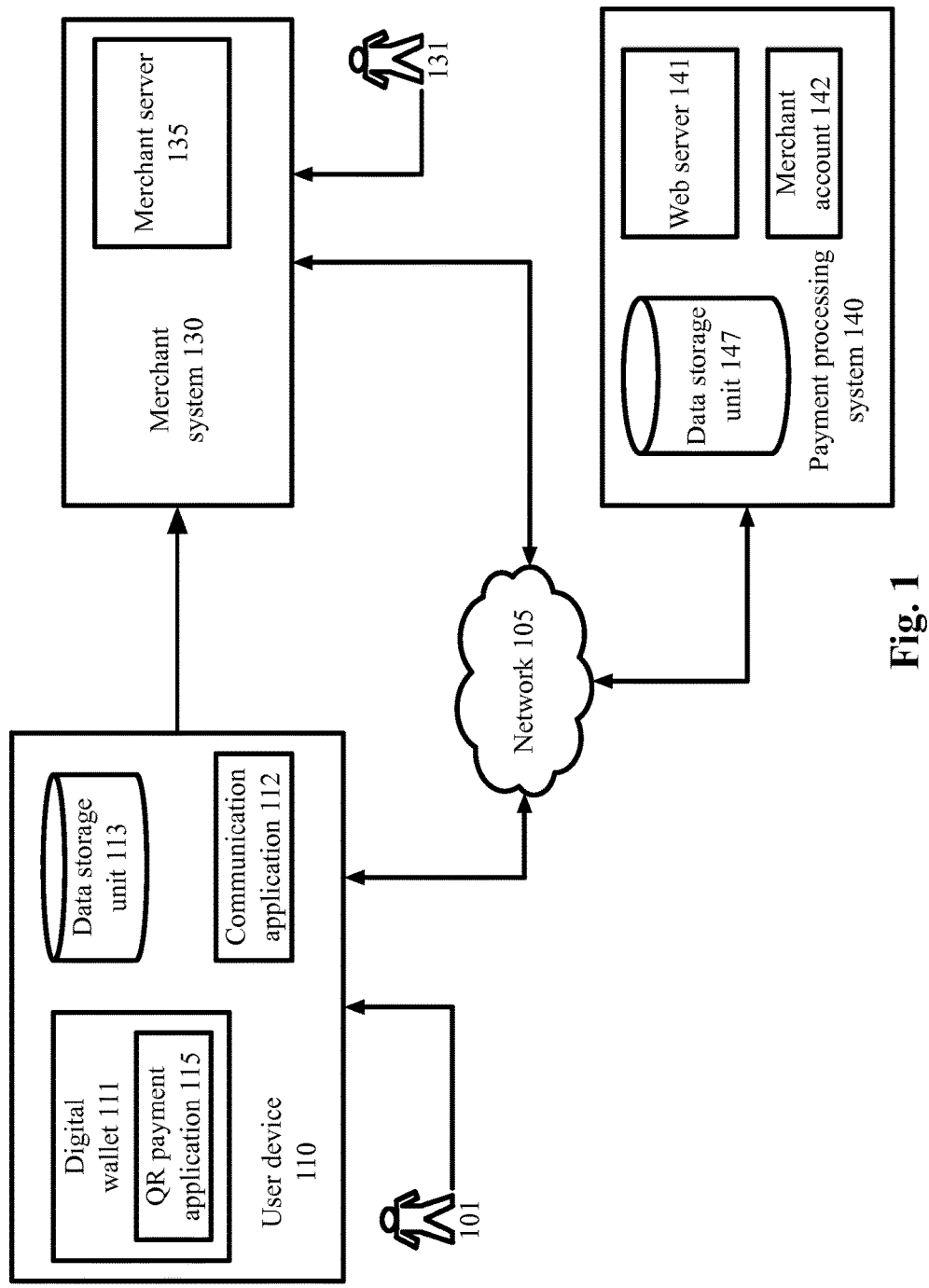
FIG. 1 is a block diagram depicting a system for conducting mobile transactions with vendor QR codes, in accordance with certain example embodiments.

As disclosed herein, a user desires to conduct a purchase transaction with a vendor or other merchant system operator. The vendor presents an identification code, such as a QR code or any other machine-readable code, to the user computing device. The user computing device receives the QR code, for example, by scanning the code with a QR payment application on the user's computing device. The identification code can also be passed from the vendor to the user computing device by other means, such as near-field communication (NFC) or radio-frequency identification (RFID). In certain example embodiments, the vendor can provide the identification code to the user manually, such as by inputting the identification code into the user device. The vendor can also have the user input the vendor's identification code into the payment application on the user computing device. In some embodiments, the merchant can provide the identification code to the user in other suitable ways (for example, the merchant may have a number or code displayed which the user can input into the user computing device).

In addition to the identification code, the payment application receives transaction details, including user financial account information, for the purchase transaction. For example, the user inputs transaction details into the payment application. The payment application initiates a transaction with a payment processing system, and provides the transactions details and the vendor identification code to the payment processing system. With the identification code, the payment processing system can identify the merchant associated with the vendor, for example, and authenticates the user financial information. The user computing device receives verification from the payment processing system that the transaction is authorized. The payment application presents an authentication of the authorized (verified) transaction for the vendor to view, which includes an authorization indicator such as a confidential password or other communication. After viewing the authorization indicator, the vendor can confirm the authenticity of the transaction provide the product to the user. The payment processing system transfers funds from an account of the user to an account of the merchant system. The merchant system can distribute a portion of the funds or other credit to the particular vendor who conducted the transaction.

In certain example embodiments, the payment processing system can, alternatively or additionally, communicate the authorization, including the authorization indicator, to a merchant computing device. In this case, the vendor or other merchant system operator can view the authorization via the merchant computing device.

More particularly, in certain example embodiments a user can install a QR payment application on a user computing device. The QR payment application can be obtained from a website or other location on the Internet. For example, the QR payment application can be provided by a payment processing system that manages the QR transactions. The QR payment application can be provided by another financial account issuer. The QR payment application can be installed from a portable memory device distributed by the payment processing system or other system. Any other manner of installing the QR payment application on the user computing device can be employed.

The QR payment application can be operable to read merchant QR codes to conduct a transaction. A "QR" code is an abbreviation for "quick response" code. A QR code is a machine readable code that can be scanned by a user computing device or other computing device. The QR code can provide information, instructions, links, identification, or other data to the user computing device that scans the QR code. The QR code can direct the user computing device to open a website over the Internet. The QR code can provide merchant system information and vendor information. The QR code can provide any suitable information to the user computing device to conduct a transaction.

In certain examples, the vendor can provide another suitable machine readable code, such as a bar code, text code, password, or an alpha-numeric code. Any suitable code or image can be employed to perform the functions described as being performed by the QR code. A "QR code" will be used in the specification to represent any machine readable code or image. The identification code can be passed from the vendor to the user computing device by any means, such as near-field communication or radio-frequency identification. For example, the vendor may have a badge or identification card that can user device can scan, "tap" or swipe to receive the identification code.

The "merchant system" can represent a merchant location, such as a store, restaurant, or an online merchant. The merchant system can be an organization that comprises multiple merchant locations. The merchant system can be a single operator vending a product. The merchant system can manage multiple vendors that sell merchant products, conduct transactions, or perform any suitable merchant system functions.

The "merchant system" can be comprised of a single vendor operating the merchant system. The merchant system may have one or more "merchant system operators," such as vendors operating independently in association with the merchant system, or the vendors may be operating directly for the merchant system. Any of the functions of a merchant system may be conducted by a vendor. Any of the functions of a vendor may be conducted by a merchant system.

The merchant system can establish an account at a payment processing system. The merchant system can establish one account for a group of vendors operating in the merchant system. The merchant system can establish accounts within the merchant system account for each one of the one or more vendors associated with the merchant system.

The merchant system can obtain QR codes for the merchant system, for each vendor within the merchant system, for groups of vendors, or for any suitable grouping. The QR codes can be produced by the payment processing system and provided to the merchant system. In an alternate example, the QR codes can be provided by a third party system, such as a provider of QR codes. In an alternate example, the QR codes can be produced by the merchant system, such as with a QR code application or other software program. The QR codes can be printed on paper, plastic, or any suitable medium. The QR codes can be digital and stored on a computing device of the merchant system. Any other suitable embodiment of the QR codes can be employed. Any other suitable party can produce the QR codes.

The QR codes can be distributed to the one or more vendors. For example, a unique QR code can be provided to each of the one or more vendors. In another example, a group of vendors can be provided with a particular QR code. In another example, the merchant system may only use a single QR code at a particular time. That is, the merchant system may only have one vendor or operator using a code, or all vendors of the merchant system may use the same QR code.

The QR codes can be provided to the vendors on a card or other medium. The QR code can be printed on the card or in any suitable manner affixed to the card. In one example, the QR code may be distributed to the vendors electronically. The QR code may be provided to the vendor in any suitable manner. A vendor keeps the QR code available for use in a transaction with a user.

The vendor can be a food vendor at a sporting or music event who needs to conduct transactions while moving about the venue. In another example, a vendor may sell items door-to-door and conduct transactions at the location of the user/consumer, such as at the home or business of the user. The vendor may be a salesperson at a large merchant location and conduct transactions in remote locations of the merchant location. The vendor may be an online outlet conducting transaction on the Internet. The vendor may be any other type of merchant operator that desires to conduct transactions with user computing devices without a vendor computing device.

The vendor initiates a transaction with a user. In an example, a vendor can conduct the transaction with a user computing device of the user. For example, the vendor may provide a product and the user agrees to purchase the product. The term "product" refers to any tangible or intangible product or products provided by the vendor, as well as services. The user can agree to purchase the product and provide a user computing device to conduct the transaction with the vendor.

The user can scan the QR code of the vendor with the user computing device. The user can initiate a QR payment application to obtain the scanned image. In a certain example, the QR payment application operates on the digital wallet application module. In another example, the functions of the QR payment application are performed by a digital wallet application module.

In an example embodiment, the vendor can provide a card containing the QR code to the user for scanning In another example, the user can scan the QR code from the display of a computing device of the vendor. The user computing device can scan the QR code from any suitable display or presentation provided by the vendor. The QR payment application can utilize the camera function of the user computing device. In another example the QR payment application can obtain the scanned image of the QR code from an external image capturing device coupled to the user computing device. Any other suitable image capturing device or technique can be utilized.

The user or the vendor enters the transaction details into the user computing device. For example, the user enters the transaction details into an operator interface of the QR payment application. The transaction data can include the information from the scanned QR code, for example. The transaction data can also include the transaction amount, the product being purchased, the date, the time, the location, or any other suitable information. In another example, the vendor can enter the information into the user computing device.

In another example, the QR payment application can gather some or all of the transaction data from the user computing device or other suitable sources. For example, the QR payment application can obtain the user financial account data from a digital wallet application module or other financial application. For example, the user can associate with the digital wallet account multiple debit/credit cards maintained by multiple issuers (including the payment processing system operating as an issuer), stored value cards (for example, gift cards, prepaid cards, re-loadable transaction cards, exchange cards, and other forms of non-credit based value cards), loyalty cards or other store rewards cards, value added service accounts (for example, coupons, vouchers for prepaid offers, redemption offers, and other forms of offers), peer-to-peer transaction accounts, bank accounts and/or other forms of financial accounts. The user can select the financial account with which to conduct the transaction at the time of the transaction from among the payment accounts associated with the digital wallet account.

The user can select the payment account at the time of the transaction by making a selection on the user interface of the QR payment application or the digital wallet application module. The user can configure a default or pre-selected card for future transactions. The selection of the financial account may be made by the payment processing system after receiving the transaction request. Any other suitable manner of selecting a financial account with which to conduct the transaction can be utilized.

The QR payment application receives the vendor data, the user financial account data, and the transaction data from the user computing device or any suitable source. The user computing device can scan a product identifier and access a product name and description. The user computing device can identify any other transaction data and provide it to the QR payment application.

The QR payment application can obtain the location from the global positioning system ("GPS") software or hardware of the user computing device. The location can be obtained from Wi-Fi data, cellular telephone service location techniques, or any suitable location method. The time, date, and other suitable transaction details can be obtained from the user computing device or any suitable source.

The QR payment application transmits the vendor data from the QR code, user financial account data, transaction data, and any other suitable data to the payment processing system. The QR payment application can transmit the data via an Internet connection over the network, email, or any suitable communication technology.

The payment processing system conducts the transaction with the user financial account. The payment processing system identifies the merchant system associated with the vendor based on the information from the scanned QR code. The payment processing system can maintain a listing of merchant systems and vendor information on a database. The database can be stored on a payment processing system data storage unit or any other suitable storage location. The payment processing system can determine the identity of the individual vendor if more than one vendor is associated with the merchant system based on the QR code information and the stored data.

The payment processing system can identify the financial account of the user to be used in the transaction. For example, the payment processing system can receive the financial account data from the QR payment application, or the payment processing system can identify the financial account data from an account stored on the payment processing system. The payment processing system can access an account of the user on the payment processing system and determine the appropriate financial account to utilize in the transaction. The appropriate financial account can be determined by a set of rules established on the user account, by an input of the user, by a determination of the payment processing system, or by any other suitable determination. The financial account may be maintained by the payment processing system.

The payment processing system conducts the transaction with the merchant system and the issuer of the financial account. For example, the payment processing system can obtain an authorization from an issuer of the financial account. The payment processing system can provide the authorization if the payment processing system is the issuer of the financial account. Any suitable manner of obtaining an authorization for the transaction can be utilized.

The payment processing system provides the authorization and authentication to the user computing device. For example, the payment processing system can transmit a notification to the user computing device that the transaction is authorized. The transmission can be via an Internet connection over the network, email, text, or any suitable communication technology.

As part of the authorization and authentication, the payment processing system also provides an authorization indicator to the vendor on the user computing device, which indicates to the vendor that the transaction is authorized. For example, the vendor or the merchant system can have a confidential password established to authenticate the transaction. When the vendor views the password on the user computing device, the vendor knows that the transaction is authorized and that the vendor can provide the product to the user. The authorization indicator can comprise, for example, a password, code, phrase, picture, photograph, symbol, or other suitable message that can verify to the vendor that the payment processing system has successfully authorized the transaction.

The authentication indicator prevents the user from providing a fraudulent authorization for the transaction. That is, the authorization indicator assures the vendor that the transaction was conducted and that the user has not provided a simulated authorization message. If the user computing device does not display the authorization indicator, then the vendor can determine that the transaction was fraudulent, incomplete, or otherwise not authorized. The vendor can then withhold the product from the user. Upon receiving the authorization indicator, the vendor can provide the product to the user.

The payment processing system or the issuer of the financial account can transmit the funds to the merchant system. The transmission of funds can be conducted immediately or at a time after the transaction is conducted with the vendor. The funds can be transmitted via any suitable fund transmission system or method. In an example, the funds can be deposited in an account of the merchant system on the payment processing system.

The merchant system can receive the funds and any transaction data provided. The merchant system can receive the information provided by the scanned QR code. If the QR code information is associated with a particular vendor, then the transaction can be associated with the particular vendor in the merchant system. The payment processing system can provide the information read from the scanned QR code, the QR code itself, information from a webpage linked by the scanned QR code, or any other suitable information provided by the QR code. The merchant system can access a database on a merchant server, or other suitable storage device, and identify a particular vendor associated with the QR code.

In an example, the merchant system can provide the particular vendor with a credit for the transaction. That is, the vendor can be a commissioned salesperson and receive a portion of the funds for the transaction. In another example, the transaction is associated with the vendor for logging purposes. In another example, the vendor is an independent operator and the merchant system transfers some or all of the provided funds to the vendor. The merchant system can perform any suitable action with the funds and the transaction data.

In an example, the merchant system comprises only one vendor or all vendors of the merchant system use the same QR code. Thus, the merchant system logs all sales with the QR code and does not associate a particular vendor with the transaction.

In an example, the vendor has an account with the payment processing system and the funds are transferred to directly to the vendor. For example, the payment processing system can deposit funds from a transaction associated with the vendor directly into the vendor account. In another example, the payment processing system can transmit the funds to any suitable financial account of the user, such as a bank account at a financial institution or a stored value account. In another example, the payment processing system can provide the vendor a check.

In an example, a vendor has an account associated with a merchant account on the payment processing system. The payment processing system can determine the vendor associated with a transaction from the information provided by the QR code or from any other suitable source. The payment processing system can deposit some or all of the funds directly into the vendor account. Any remaining funds can be deposited into the merchant system account.

Example System Architectures

Turning now to the drawings, in which like numerals represent like (but not necessarily identical) elements throughout the figures, example embodiments are described in detail.

FIG. 1 is a block diagram depicting a system 100 for conducting mobile transactions with vendor QR codes, in accordance with certain example embodiments.

As depicted in FIG. 1, the system 100 includes network computing devices 110, 130, and 140 that are configured to communicate with one another via one or more networks 105.

Each network 105 includes a wired or wireless telecommunication means by which network devices (including devices 110, 130, and 140) can exchange data. For example, each network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment. In some embodiments, a user associated with a device must install an application and/or make a feature selection to obtain the benefits of the techniques described herein.

Each network device 110, 130, and 140 includes a device having a communication module capable of transmitting and receiving data over the network 105. For example, each network device 110, 130, and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 130, and 140 are operated by end-users or consumers, merchant system operators (such as vendors 131 of the merchant system), and payment processing system operators, respectively.

The user 101 can use the communication application 112, which may be, for example, a web browser application or a stand-alone application, to view, download, upload, or otherwise access documents or web pages via a distributed network 105. The network 105 includes a wired or wireless telecommunication system or device by which network devices (including devices 110, 130, and 140) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages.

The communication application 112 can interact with web servers or other computing devices connected to the network 105, including a point of sale terminal (not shown) of the merchant system 130, the merchant server 135 of the merchant system 130, and the web server 141 of the payment processing system 140.

The user network device 110 may include a digital wallet 111. The digital wallet 111 may encompass any application, hardware, software, or process the user computing device 110 may employ to assist the user 101 in completing a purchase. The digital wallet 111 can interact with the communication application 112 or can be embodied as a companion application of the communication application 112. As a companion application, the digital wallet 111 can execute within the communication application 112. That is, the digital wallet 111 may be an application program embedded in the communication application 112.

The user network computing device 110 can also include a data storage unit 113. The example data storage unit 113 can include one or more tangible computer-readable storage devices. The data storage unit 113 can be a component of the user device 110 or be logically coupled to the user device 110. For example, the data storage unit 113 can include on-board flash memory and/or one or more removable memory cards or removable flash memory.

The payment processing computing system 140 includes a data storage unit 147. The example data storage unit 147 can include one or more tangible computer-readable storage devices. The data storage unit 147 can be stored on a device of the payment processing system 140 or be logically coupled to a device of the payment processing system 140. For example, the data storage unit 144 can include on-board flash memory and/or one or more removable memory cards or removable flash memory. The data storage unit 147 can store a record of the merchant system 130, such as information regarding the merchant account 142 and QR codes for merchant system operators such as vendors 131 of the merchant system.

The user device 110 may also include a payment application such as a QR payment application 115. The QR payment application 115 can encompass any application, hardware, software, or process the user computing device 110 may employ to assist the user 101 in completing a purchase with the merchant system 130 and/or a merchant system operator such as a vendor 131 of the merchant system 130. The QR payment application 115 can interact with the communication application 112 or can be embodied as a companion application of the communication application 112. As a companion application, the QR payment application 115 can execute within the communication application 112. That is, the QR payment application 115 may be an application program embedded in the communication application 112. The QR payment application 115 can, for example, facilitate communication between the merchant system 130, a merchant system operator such as a vendor 131, and the payment processing system 140. The QR payment application is configured to receive QR codes from a merchant system operator such as a vendor 131. For example, the QR payment application 115 may be logically coupled to a camera associated with the user device 110, such that the QR payment application can facilitate scanning of a QR code. Additionally or alternatively, the QR payment application can be logically coupled to applications for sending and receiving near-field communication or radio-frequency identification, such that the QR payment application can receive QR codes (or other types of codes) therewith.

The merchant computing system 130 represents a system that offers products for the user 101 to purchase or use. In certain example embodiments, the merchant system 130 includes a point-of-sale ("POS") terminal (not shown). The point-of-sale terminal may be operated by a salesperson that enters purchase data into the point-of-sale terminal to complete a purchase transaction. The merchant system 130 may be a physical location or an online merchant or comprise both a physical location and an online merchant. Affiliated or associated with the merchant system 130 is a merchant system operator such as a vendor of the merchant system 130.

The payment processing system 140, for example, conducts payment transactions on behalf of the user 101, the merchant system 130, and merchant system operators such as vendors 131 of the merchant system 130. The user 101 can use a web server 141 on the payment processing system 140 to view, register, download, upload, or otherwise access the payment processing system 140 via a website (not shown) and a communication network 105. The user 101 can configure one or more registered financial card accounts, including bank account debit cards, credit cards, gift cards, loyalty cards, coupons, offers, prepaid offers, store rewards cards, or other type of financial account that can be used to make a purchase or redeem value-added services with a payment account of the user 101. For example, the user can configure a digital wallet account (not shown) with the payment processing system 140. In certain example embodiments, the payment processing system 140 may function as the issuer for the user-associated financial account. The user's 101 registration information can be stored in the data storage unit 147 of the payment processing system 140. The merchant system 130 can also configure one or more registered merchant accounts 142 with the payment processing system.

The payment processing system 140 includes a data storage unit 147. The example data storage unit 147 can include one or more tangible computer-readable storage devices. The data storage unit 147 can be stored on a device of the payment processing system 140 or be logically coupled to a device of the payment processing system 140. For example, the data storage unit 144 can include on-board flash memory and/or one or more removable memory cards or removable flash memory. The data storage unit 147 can store a record of the merchant system 130, such as information regarding the merchant account 142 and QR codes for merchant system operators such as vendors 131 of the merchant system. In certain example embodiments, the payment processing system 140 can function as part of the merchant system 130. As such, the merchant system 130 can perform any and all of the functions of the payment processing system 140 described herein.

It will be appreciated that the network connections shown are example and other means of establishing a communications link between the computers and devices can be used. Moreover, those having ordinary skill in the art having the benefit of the present disclosure will appreciate that the merchant system 130, payment processing system 140, the financial account 170, and the user computing device 110 illustrated in FIG. 1 can have any of several other suitable computer system configurations. For example a user computing device 110 embodied as a mobile phone or handheld computer may not include all the components described above.

Example Processes

Figure 2:
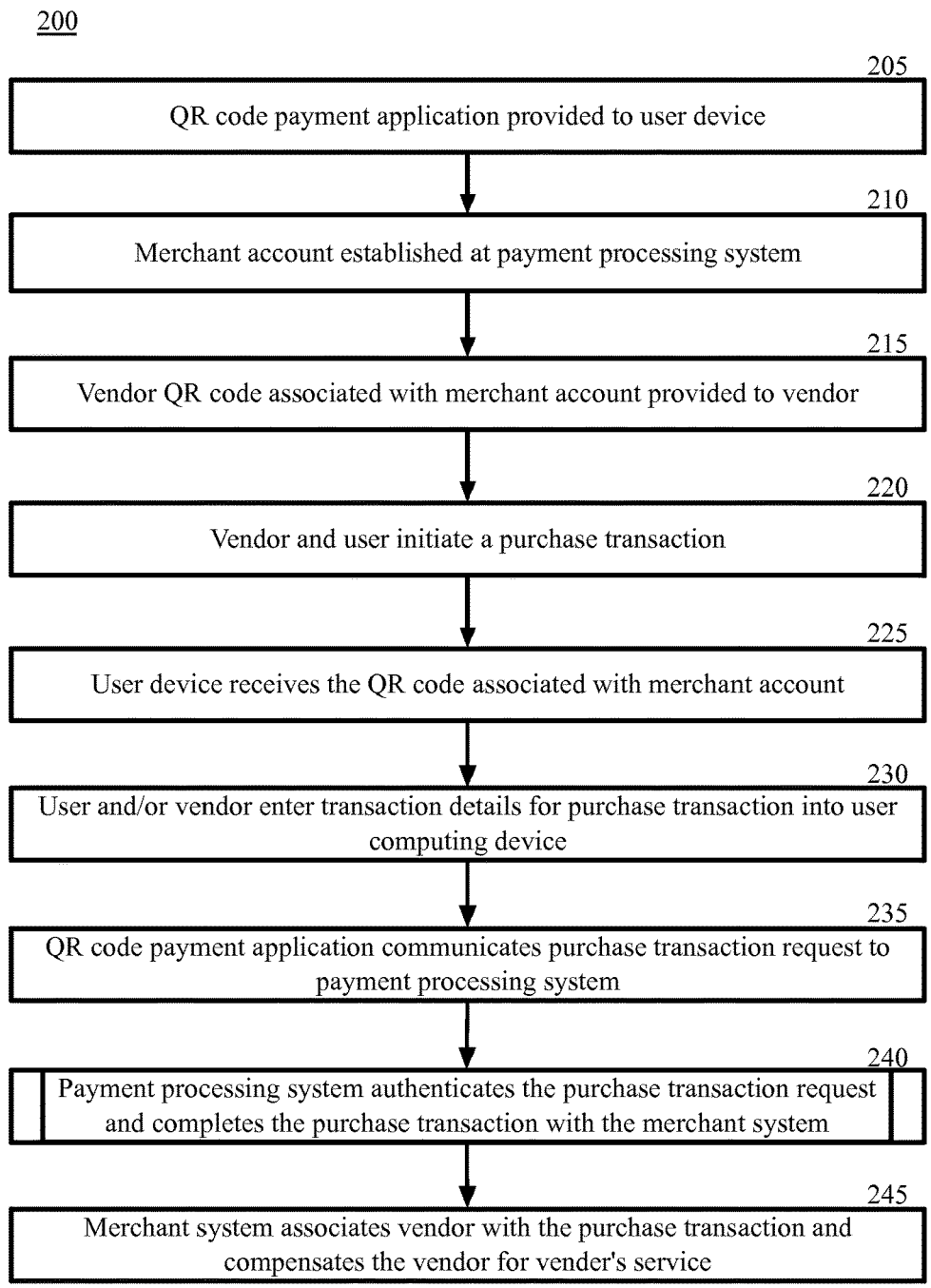
FIG. 2 is a block flow diagram depicting a method for conducting mobile transactions with vendor QR codes, in accordance with certain example embodiments.
Figure 3:
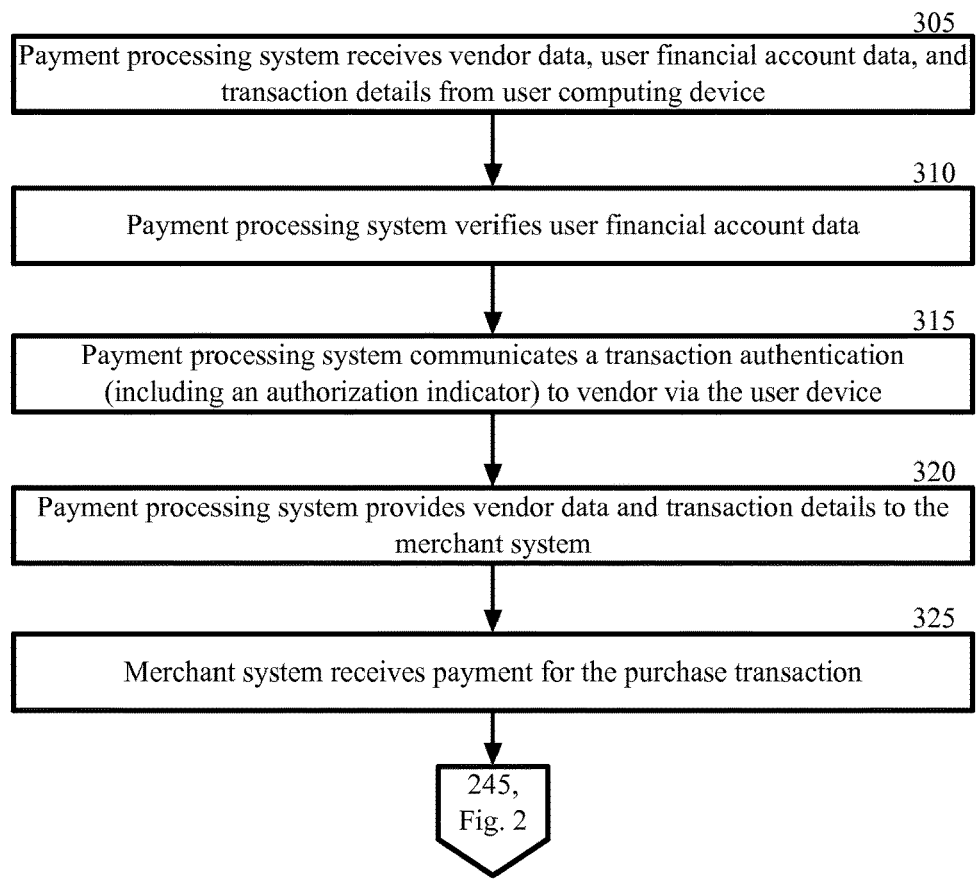
FIG. 3 is a block flow diagram depicting a method for authenticating and completing a purchase transaction, in accordance with certain example embodiments.
Figure 4:
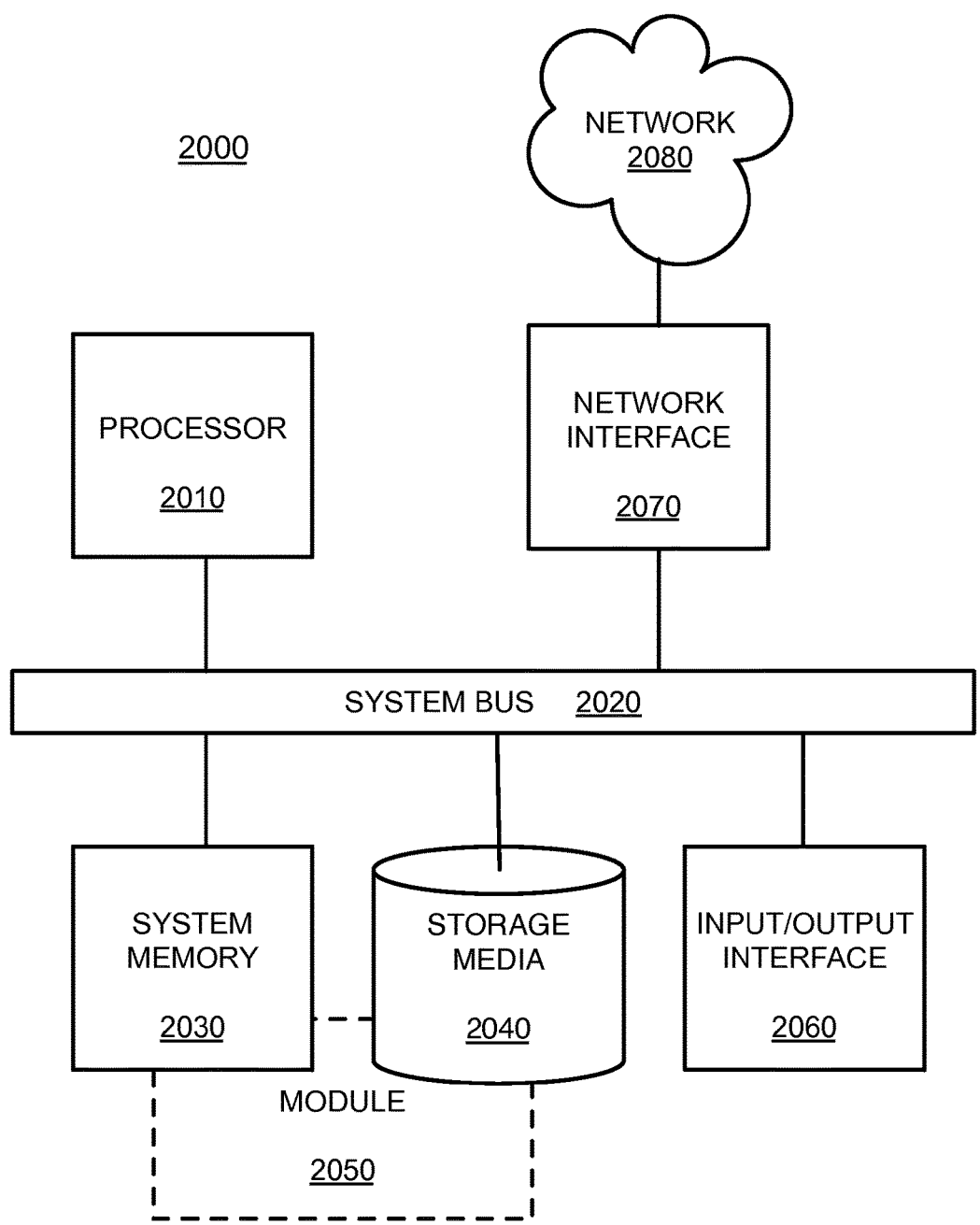
FIG. 4 is a block diagram depicting a computing machine and a module, in accordance with certain example embodiments.

The example methods illustrated in FIG. 2-4 are described hereinafter with respect to the components of the example operating environment 100. The example methods of FIGS. 2-4 may also be performed with other systems and in other environments.

FIG. 2 is a block flow diagram depicting a method 200 for conducting mobile transactions with vendor QR codes, in accordance with certain example embodiments.

With reference to FIGS. 1 and 2, in block 205, a payment application is provided to a user device 110. For example, a QR code payment application 115 is provided to a user device 110. That is, a user 101 can install the QR payment application 115 on a user computing device 110 after, for example, downloading the QR payment application 115 from the Internet. In certain example embodiments, the user 101 can obtain the QR payment application 115 from the website (not shown) of a merchant system 130 or a payment processing system 140 that manages QR transactions for the merchant system 130. In certain example embodiments, the QR payment application 115 can be installed from a portable memory device distributed by the payment processing system 140 or other system such as the merchant system 130. Any other manner of installing the QR payment application 115 on the user device 110 can be employed. With the QR payment application 115, for example, a user device 110 can receive QR codes from a vendor, such as by scanning a QR code that a vendor provides.

In block 210, a merchant system 130 establishes a merchant account 142 with a payment processing system 140. That is, the merchant system 130 provides a request to create a merchant account 142 with the payment processing system 140, and the payment processing system receives the request from the merchant system 130. For example, the merchant system 130 can provide the request to create a merchant account 142 via the network 105, and the payment processing system 140 receives the request via the network 105. The payment processing system 140 then creates the merchant account 142, which allows the payment processing system 140 to process purchase transactions involving the merchant system 130. In certain example embodiments, the merchant system 130 can establish one merchant account 142 for a group of vendors 131 of the merchant system 130. In certain other example embodiments, the merchant system 130 can establish multiple accounts within the merchant account 142 for each one of the one or more vendors 131 of the merchant system 130.

As part of establishing the merchant account 142, the merchant system 130 can provide information regarding the merchant system 130. For example, the merchant system 130 can provide merchant financial account information to the payment processing system 140 to facilitate financial transactions between the merchant system 130 and the payment processing system 140. The merchant system 130 can also provide merchant operator identification codes that are associated with particular merchant operators of the merchant system 130. For example, the merchant system can provide the payment processing system 140 identification codes for one or more vendors 131 of the merchant system 130, such as QR codes associated with the one or more vendors 131.

In certain example embodiments, the merchant system 130 can provide the payment processing system 140 the name and/or identification number for one or more vendors 131 of the merchant system 130. Based on the vendor name and/or identification numbers received, the payment processing system 140 can, in certain example embodiments, create the identification code for a vendor. For example, the payment processing system 140 can create a QR code for the one or more vendors 131, thereby associating specific QR codes with specific vendors 131 of the merchant system 130. In certain example embodiments, the merchant system 130 can provide the payment processing system an authorization indicator that is associated with identification code for the merchant system operate. For example, a vendor 131 can use the authorization indicator as discussed herein to confirm the authorization of the transaction as discussed herein.

When establishing a merchant account 142 with the payment processing system 140, the merchant can also provide merchant system credentials to the payment processing system 140. For example, the merchant system 130 can provide the address, billing address, and payment address of the merchant system 130. The merchant system 130 may also establish rules for processing payments with the payment processing system 140, such a rules for receiving payment from the payment processing system 140. The merchant system 130 may, in certain example embodiments, also provide information regarding the product(s) that the merchant system 130 offers for sale.

In certain example embodiments, the payment processing system 140 provides the merchant system with an interface specification, such as application programming interface ("API"), so that the merchant system 130 may communicate directly with the payment processing system 140. For example, an application programming interface may allow the merchant system 130 to provide merchant information directly to the payment processing system 140. Additionally or alternatively, the application programming interface may allow the payment processing system 140 and/or merchant system 130 to communicate directly with user device 110 via the network 105. The application programming interface may also allow the merchant system 130 to provide merchant operator identification codes, such as vendor QR codes, directly to the payment processing system 140.

Once the payment processing system 140 receives information and credentials from the merchant system 130 for creating the merchant account 142, the payment processing system 140 can associate the merchant information and credentials with the merchant account 142. That is, the payment processing system 140 can associate the merchant financial account information, the merchant operator identification code (such as the QR code for one or more vendors 131), and any other merchant information with a record for the merchant system in a merchant account 142. For example, the merchant financial account information, a QR code for one or more vendors 131, and any other merchant information can be stored in the data storage unit 147 of the payment processing system 140, so that the information is accessible to the payment processing system 140. The payment processing system 140 can also associate the authorization indicators with the merchant account 142.

In block 215, a merchant operator identification code, such as a vendor identification code associated with merchant account 142, is provided to the merchant system operator of the merchant system 130. For example, for a particular vendor 131 associated with the merchant system 130, the payment processing system 140 provides the vendor 131 with the QR code associated with the merchant account 142.

Additionally or alternatively, the merchant system 130 can provide a QR code to the vendor 131. The QR code can be communicated to the vendor 131, for example, electronically via the network 105, such as through email, text messaging, or other suitable communication means. Additional or alternatively, the payment processing system 140 and/or the merchant system 130 can provide the QR code to the vendor 131 by mail or hand delivery. The QR codes can be provided to the vendors 131 on a card, paper, or other medium. For example, a QR code for a vendor 131 can be printed on a card or in any suitable manner affixed to a card. The vendor 131 can then carry the card on the vendor's person. Once the vendor 131 receives the QR code, the vendor 131 can keep the QR code available for use in a purchase transaction with a user 101.

Additionally or alternatively, the vendor 131 may receive a badge, identification card, or other device capable of communicating an identification code to the user device 110. For example, the badge, identification card, or other device communicates the identification code to the user device 110 by near-field communication, radio-frequency identification, via a cellular or other mobile communication network, or via a Bluetooth connection. A user 101, for example, can "tap" a vendor badge with the user device 110 to receive the identification code.

In certain example embodiments, a unique identification code, such as a QR code, can be provided to each of the one or more vendors 131 of the merchant system 130. Alternatively, a group of vendors can be provided with a particular QR code. That is, a single QR code that is the same for all members of the vendor group can be provided to the group of vendors 131. In another example embodiment, the merchant system 130 may only use a single QR code at a particular time. For example, the merchant system 130 may only have one vendor 131 or operator using a QR code, or all vendors 131 of the merchant system 130 may use the same QR code.

In block 220, a merchant system operator (such as a vendor 131) and a user 101 initiate a purchase transaction. For example, a vendor 131 can provide offer a product on behalf of a merchant system 130 to user 101. The term "product" refers to any tangible or intangible product or products provided that the vendor 131 provides on behalf of the merchant system 130. "Products" also include services that the vendor 131 provides on behalf of the merchant system 130. The user 101 agrees to purchase the product from the vendor 131. Further, the vendor 131 and the user 101 agree to process the transaction with the user computing device 110. That is, a vendor computing device, such as a mobile computing device, is not necessary to complete the purchase transaction between the vendor 131 and the user 101. For example, the user 101 agrees to receive the identification code of the vendor 131, such as by scanning the QR code that the payment processing system 140 provided to the vendor 131.

In block 225, the user device 110 receives the merchant operator identification code, such as the QR code of the vendor 131, that is associated with the merchant account 142. That is, the identification code of the vendor 131 is input into the user device 110. For example, the vendor 131 presents the identification code to the user 101. For a QR code (or other machine-readable code), the vendor 131 or the user 101 can scan the QR code to the user device 110, such as by using the QR payment application 115 on the user device 110.

Alternatively, the vendor 131 can provide the vendor identification code to the user device 110 in other acceptable ways, such as by having the user 101 manually input the identification code into the payment application on the user computing device. The vendor 131 can also manually input the identification code of the vendor 131 into the user device 110. That is, the user 101 or the vendor 131 can manually input the identification code of the vendor 131 into a user interface associated with the user device 110, such as a user interface associated with the QR payment application 115 on the user device 110. In certain other example embodiments, the vendor 131 can provide the vendor identification code to the user device 110 via the network 105, such as by email or text messaging. Additionally or alternatively, the vendor 131 may provide the vendor identification code to the user device 110 using a cellular or other mobile communication network, a Bluetooth connection, a near-field communication connection, a radio-frequency identification, or any combination thereof. For example, the vendor may have a badge or identification card that can user device can scan, "tap," or swipe to receive the identification code.

In block 230, the user 101 and/or the vendor 131 enter transaction details for the purchase transaction into user device 110. For example, the user 101 or the vendor 131 can input information about the purchase transaction into a user interface of the user device, such as a user interface associated with the QR payment application 115. The transaction details can include, for example, the identity of the user 101 and information about the vendor 131. The transaction details can also include the transaction amount, any added gratuity, the product being purchased, the date, the time, the location, or any other information that may be pertinent to a purchase transaction. The transaction details can also include contact information for the user 101, for example, such as an email address off the user 101.

In certain example embodiments, the transaction details can also include the financial account data for the user 101. At the time of the purchase transaction, for example, the user 101 can select a user financial account with which to conduct the purchase transaction from among several financial accounts of the user 101. For example, the user 101 can manually enter a credit or debit card number into a user interface of the QR payment application 115, along with the expiration date and a card security code associated with the credit or debit card. In certain other embodiments, the user 101 can use the QR payment application 115 to scan a credit or debit card of the user 101 in order to receive financial account data for the user 101.

In certain example embodiments, the user 101 can employ the QR payment application 115 to gather some or all of the transaction details from the user device 110 of the user 101. For example, when a user 101 has a digital wallet 111, the QR payment application 115 can retrieve the financial account data of the user 101 directly from the digital wallet 111. The user 101, for example, can associate with the digital wallet 111 multiple debit/credit cards maintained by multiple issuers (including the payment processing system operating as an issuer), stored value cards (for example, gift cards, prepaid cards, re-loadable transaction cards, exchange cards, and other forms of non-credit based value cards), loyalty cards or other store rewards cards, value added service accounts (for example, coupons, vouchers for prepaid offers, redemption offers, and other forms of offers), peer-to-peer transaction accounts, bank accounts and/or other forms of financial accounts.

In certain example embodiments, the user 101 can establish rules, such as with a digital wallet provider, for selecting a financial account for payment in a transaction. In certain example embodiments, the user 101 can select the financial account with which to conduct the purchase transaction from among the financial accounts associated with the digital wallet 111. The user 101 can also configure a default or pre-selected card for future transactions, for example. In certain example embodiments, the payment processing system 140 make select the financial account for the purchase transaction, such as when the user 101 has an account with the payment processing system 140. Any other suitable manner of selecting a financial account with which to conduct the transaction can be utilized.

In certain example embodiments, the user 101 can, at the option of the user 101, employ the QR payment application 115 to provide location data to the payment processing system 140. Based on the location of the user 101, for example, the payment processing system 140 can, in certain example embodiments, provide location-based discounts, offers, or other promotions that are relevant to the location of the purchase transaction. For example, a user 101 purchasing a baseball program from a vendor 131 outside a baseball stadium may desire to receive a coupon for merchandise from a storefront of the merchant system 130 located inside the stadium. With the location data placing the user 101 outside the stadium, the payment processing system 140 can, in certain example embodiments provide the desired merchandise coupon to the user 101 at or near the time of the purchase transaction (that is, when the user 101 is near the merchant storefront). The QR payment application 115 can obtain the location data, at the option of the user, from Wi-Fi data, cellular telephone service location techniques, or any suitable location method. The time, date, and other suitable transaction details can be obtained from the user computing device or any suitable source.

In block 235, the payment application, such as the QR code payment application 115, communicates a purchase transaction request to payment processing system 140. For example, once the QR payment application 115 receives the QR code from the vendor 131 and the transaction details associated with the purchase transaction, the QR code payment application 115 can transmit the transaction amount, the vendor QR code, the user financial account data, and any other transaction details to the payment processing system 140, thereby requesting that the payment processing system 140 process the purchase transaction. The QR payment application 115, for example, can transmit the transaction amount, the vendor QR code, the user financial account data, and any other purchase transaction details to the payment processing system 140 via network 105.

In block 240, the payment processing system 140 authenticates the purchase transaction request and completes the purchase transaction with the merchant system 130. That is, the payment processing system 140 verifies the financial account data of the user 101 and facilitates payment of the merchant system 130 for the purchase transaction. Once the payment processing system 140 authenticates the purchase transaction, the payment processing system 140 notifies the merchant system operator of the authentication via the user device 110. For example, the payment processing system 140 provides the vendor 131 with an authorization indicator to confirm the authenticity of the purchase transaction. The payment processing system 140 can also provide vendor data and transaction details to the merchant system 130, including the vendor QR code, so that the merchant can associate the vendor 131 with the purchase transaction. The details of block 240 are described in further detail below with reference to FIG. 3.

In block 245, the merchant system 130 associates the merchant system operator, such as the vendor 131, with the purchase transaction and provides compensation for the purchase transaction. That is, once the merchant system 130 receives the vendor data for the purchase transaction, the merchant system 130 can identify the vendor 131 and then pay the vendor 131 for conducting the purchase transaction with the user 101. For example, the merchant system 130 can access a database on a merchant server 135, or other suitable storage device, and identify a particular vendor 131 associated with the QR code received as part of the vendor data. Additionally or alternatively, the payment processing system 140 can identify the vendor 131 for the merchant system 130.

Once the merchant system identifies the vendor 131, the merchant system can compensate the vendor 131 for the vendor's services. For example, the merchant system 130 can mail the vendor 131 a check or pay the vendor 131 in cash. The merchant system 130 can also provide the vendor 131 with a credit for the purchase transaction. That is, the vendor 131 can be a commissioned salesperson and receive a portion of the funds for the purchase transaction. In another example, the transaction is associated with the vendor 131 for logging purposes, such as keeping track of the vendor's sales. In another example, the vendor 131 is an independent operator and the merchant system 130 transfers some or all of the provided funds to the vendor 131. For example, the merchant system can deposit funds in a bank account of the vendor 131. The merchant system 130 can perform any suitable action with the funds and the transaction data.

In one example embodiment, the vendor 131 has an account with the payment processing system 140 and the funds are transferred to directly to the vendor 131 from the payment processing system 140. For example, the payment processing system 140 can deposit funds from a transaction associated with the vendor 131 directly into the vendor account with the payment processing system 140. In another example embodiment, the payment processing system 140 can transmit the funds to any suitable financial account of the user 101, such as a bank account at a financial institution or a stored value account. In another example embodiment, a vendor 131 has an account associated with a merchant account 142 on the payment processing system 140. The payment processing system 140 can determine the vendor 131 associated with the purchase transaction from the information provided by the QR code or from any other suitable source. The payment processing system 140 can deposit some or all of the funds directly into the vendor account. Any remaining funds can be deposited into the merchant system account.

FIG. 3 is a block flow diagram depicting a method 240 for authenticating and completing a purchase transaction, in accordance with certain example embodiments.

With reference to FIGS. 1 and 2, in block 305 of method 240, the payment processing system 140 receives merchant operator data (such as vendor data), user financial account data, and transaction details from the user device 110. That is, once the payment application, such as the QR code payment application 115, communicates the purchase transaction request to the payment processing system 140, the payment processing system 140 receives the request via the network 105. For example, the payment processing system 140 receives from the QR code payment application 115 on the user device 110 the transaction amount, the vendor QR code, the user financial account data, and any other transaction details that may be pertinent to the purchase transaction.

With the vendor data, for example, the payment processing system can identify the merchant system 130 to which the vendor 131 corresponds. That is, the payment processing system 140 can determine a record for the merchant system 130 based on the information received from the user device 110, such as the merchant identification code. The payment processing system 140 can also verify that the received identification code does in fact match an identification code associated with the record for the merchant account 142. The payment processing system 140 can also determine the merchant financial account associated with the merchant account 142.

In block 310, the payment processing system 140 verifies the user financial account data for the purchase transaction. That is, once the payment processing system 140 receives the data associated with the financial account of the user 101, the payment processing system 140 confirms the authenticity of the financial account data by verifying a financial account record of the user 101. For example, if user 101 has manually provided a financial account for payment, such as by inputting a credit card number into the user device 110 as described herein, the payment processing system 140 can obtain an authorization to charge the user's account from the issuer of the account. That is, the payment processing system 140 obtains an acknowledgement from the issuer of the user's financial account to charge the account for the transaction amount associated with the purchase transaction, thereby verifying the user financial account. The payment processing system 140 can then charge the financial account of the user 101. If, for example, the user 101 has a digital wallet 111 as described herein, in certain example embodiments the payment processing system 140 can obtain authorization to charge the user's digital wallet from the issuer of a financial account associated with the user's digital wallet 111. The payment processing system 140 can then charge the digital wallet account of the user 101 for the purchase transaction.

In block 315, the payment processing system 140 communicates a transaction authentication to the merchant system operator, such as the vendor 131, via the user device 110. That is, after verifying the financial account data of the user 101, the payment processing system 140 notifies the user device 110 that the purchase transaction between the user 101 and the merchant system 130 has been authorized. For example, the payment processing system 140 can provide, via the network 105, an email, text, or other notification or alert to the user device 110 confirming the authorization of the purchase transaction. In certain example embodiments, the payment processing system 140 can provide the authorization notification through a payment application of the user device 110, such as the QR payment application 115 of the user device 110. For example, the authorization notification can appear on a user interface associated with QR payment application 115.

As part of the transaction authentication, the payment processing system provides an authorization indicator on the user device 110 for the vendor to view. That is, the payment processing system 140 provides a confidential password, code, phrase, picture, photograph, symbol, or any other suitable message that the vendor can use to confirm the authorization and authentication of the transaction. For example, the vendor 131 or the merchant system 130 can have a password established to authenticate the transaction. The password can be displayed on the user device 110, and the vendor 131 can view the password. When the vendor 131 views the password on the user computing device, the vendor 131 knows that the transaction is authorized and that the vendor 131 can provide the product to the user. In certain embodiments, the authorization indicator can be a preselected photograph of the vendor 131.

The authentication prevents the user 101 from providing a fraudulent authorization for the transaction. That is, the authorization indicator provides a means of assuring the vendor that the payment processing system 140 successfully authorized the transaction and that the user 101 did not provide a simulated (fraudulent) authorization message to the vendor 131. If the user device 110 fails to display the authorization indicator, then the vendor 131 can determine that the transaction was fraudulent, incomplete, or otherwise not authorized. The vendor 131 can then withhold the product from the user 101. Upon receiving the authorization indicator, the vendor 131 can provide the product to the user 101.

In certain example embodiments, the payment processing system 140 can additionally or alternatively provide the transaction authentication to computing device associated with the merchant system 130. For example, the payment processing system 140 can transmit the authorization indicator to a computing device of the merchant system 110, either in addition or instead of transmitting the authorization indicator to the user device 110. A merchant system operator, such as the vendor 131 or other merchant system operator, can then view the authorization indicator on the computing device of the merchant system 130. The merchant system operation can then provide the product to the user 101 without concern that the purchase transaction is fraudulent as described herein.

In block 320, the payment processing system 140 provides merchant system operator data (such as vendor data) and transaction details to the merchant system. That is, the payment processing system 140 communicates the merchant system operator data, such as the identity of the vendor 131 and the QR code for the vendor 131, to the merchant system 130. The payment processing system 140 also communicates transaction details to the merchant system 130. With the vendor data and the payment transaction details, the merchant system 130 can, for example, associate the vendor 131 with the purchase transaction and store the transaction details in a record for the purchase transaction on a computing device of the merchant system 130. The merchant system can then compensate the vendor 131 as described herein.

In certain example embodiments, the purchase transaction may relate to a product that someone other than a vendor 131 provides to the user 101. For example, as part of the purchase transaction, the vendor 131 may provide the user with a gift card, token, receipt, credit or other item that is redeemable not with the vendor 131, but at a storefront of the merchant system 130. When the user 101 seeks to redeem the item at the storefront of the merchant system 130, the merchant system 130 can verify the authenticity of the item with, for example, a record of the transaction details stored with the merchant system 130.

In block 325, the merchant system 130 receives payment for the purchase transaction. For example, if the payment processing system 140 has processed the payment for the purchase transaction on behalf of the user 101, the payment processing system 140 can transfer funds for the payment transaction to a financial account of the merchant system 130. Alternatively, the payment processing system 140 can deposit funds in the merchant account 142 of the payment processing system 140.

In certain example embodiments, the issuer of a financial account of the user 101 can transmit funds from the user's financial account to the merchant system 130. For example, the payment processing system 140 can provide the issuer of the user's financial account with the financial account information of the merchant system 130. The issuer of the user's financial account can then transfer funds directly to the financial account of the merchant system 130.

In further example embodiments, the payment processing system 140 can transfer the financial account information of the user 101 to the merchant system 130. The merchant system 130 can then process payment directly with the issuer of the user's financial account. The issuer of the user's financial account then transfers funds to the financial account of the merchant system 130.

The transmission of funds can be conducted immediately or at a time after the purchase transaction is conducted with a vendor 131, for example. The funds can be transmitted via any suitable fund transmission system or method.

Example Systems

FIG. 4 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid sate drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to conduct electronic transactions between users and merchants using mobile user computing devices of users and without the merchants using merchant computing devices during the transactions, comprising:

associating, by one or more computing devices, a merchant financial account and a merchant operator identification code with a record for a merchant, the merchant financial account being configured to conduct digital transactions without participation of a merchant computing device;

obtaining, by an application operating on a mobile user computing device operated by a user, the merchant operator identification code from one or more images captured by the mobile user computing device of a machine readable code of the merchant operator, wherein the merchant operator identification code is encoded in a QR code;

receiving, by the one or more computing devices from the application operating on a mobile user computing device operated by a user, a purchase transaction request, the transaction request comprising a transaction amount, the merchant operator identification code, and an identification of the user;

determining, by the one or more computing devices, the merchant record and the merchant financial account associated with the merchant operator identification code received in the transaction request;

identifying, by the one or more computing devices, a user financial account based on the identification of the user received in the transaction request;

determining, by the one or more computing devices, whether to authorize the purchase transaction request;

after the purchase transaction is authorized, identifying, using the one or more computing devices, an authorization indicator stored on the one or more computing devices, the authorization indicator being a confidential message configured by the merchant and comprising information confirming the authorization of the transaction;

communicating, by the one or more computing devices, the authorization indicator to the application operating on the mobile user computing device;

instructing, by the one or more computing devices, the application operating on the mobile user computing device to display the authorization indicator for review by the merchant operator to confirm authorization of the transaction; and after authorization of the transaction is confirmed, communicating, by the one or more computing devices, the merchant operator identification code to a third party system associated with the merchant.

2. The computer-implemented method of claim 1, wherein determining whether to authorize the purchase transaction request comprises verifying the financial account of the user.

3. The computer-implemented method of claim 1, wherein the identification of the user comprises an identification of the user financial account.

4. The computer-implemented method of claim 1, wherein the authorization indicator comprises one or more of a password, code, phrase, picture, photograph, or number.

5. The computer-implemented method of claim 1, wherein the merchant operator identification code is stored with a particular merchant operator of the merchant.

6. The computer-implemented method of claim 1, wherein the merchant operator identification code is stored with a plurality of merchant operators of the merchant.

7. The computer-implemented method of claim 1, wherein the merchant operator identification code of the purchase transaction request is obtained by the user computing device via scanning the QR code, receiving a near-field communication, or receiving a radio-frequency identification.

8. A system to conduct mobile electronic transactions between users and merchants without the merchants using merchant computing devices, comprising:

a storage device;

a processor communicatively coupled to the storage device, wherein the processor executes application code instructions that are stored in the storage device to cause the system to:

store a merchant financial account and a merchant operator identification code with a record for a merchant, the merchant financial account being configured to conduct digital transactions without participation of a merchant computing device;

obtain the merchant operator identification code by an application operating on a user computing device operated by a user from images captured by the user computing device of a machine readable code provided by the merchant, wherein the merchant operator identification code is encoded in a QR code;

receive, from the application operating on the user computing device, a purchase transaction request, the request comprising a transaction amount, the merchant operator identification code, and an identification of the user;

determine the merchant record and the merchant financial account stored with the merchant operator identification code received in the transaction request;

identify a user financial account based on the identification of the user received in the transaction request;

determine to authorize the purchase transaction request;

after the purchase transaction is authorized, identify an authorization indicator stored on the one or more computing devices, the authorization indicator being a confidential message configured by the merchant and comprising information confirming the authorization of the transaction;

provide the authorization indicator to the application operating on the user computing device for the user to display to the merchant system operator to confirm authorization of the transaction; and communicating the merchant operator identification code to a third party system associated with the merchant.

9. The system of claim 8, wherein determining whether to authorize the purchase transaction request comprises verifying the financial account of the user.

10. The system of claim 8, wherein the authorization indicator comprises one or more of a password, code, phrase, picture, photograph, or number.

11. The system of claim 8, wherein the merchant operator identification code is associated with a particular merchant operator of the merchant.

12. The system of claim 8, wherein the merchant operator identification code is stored with a plurality of merchant operators of the merchant.

13. The system of claim 8, wherein the merchant operator identification code of the purchase transaction request is obtained by the user computing device via by scanning the QR code, receiving a near-field communication, or receiving a radio-frequency identification.

14. A computer program product, comprising:

a non-transitory computer-readable storage device having computer-executable program instructions embodied thereon that when executed by a computer cause the computer to conduct mobile electronic transactions between users and merchants without the merchants using merchant computing devices, the computer-executable program instructions comprising:

computer-executable program instructions to store a merchant financial account and a merchant operator identification code with a record for a merchant, the merchant financial account being configured to conduct digital transactions without participation of a merchant computing device;

computer-executable program instructions to obtain the merchant identification code by an application operating on a user computing device operated by a user from images captured by the user computing device of a machine readable code provided by the merchant operator, wherein the merchant operator identification code is encoded in a QR code;

computer-executable program instructions to receive, from the application operating on the user computing device, a purchase transaction request, the request comprising a transaction amount, the merchant operator identification code, and an identification of the user;

computer-executable program instructions to determine the merchant record and the merchant financial account stored with the merchant operator identification code received in the transaction request;

computer-executable program instructions to identify a user financial account based on the identification of the user received in the transaction request;

computer-executable program instructions to determine to authorize the purchase transaction request;

computer-executable program instructions to identify, after the purchase transaction is authorized, an authorization indicator stored on the one or more computing devices, the authorization indicator being a confidential message configured by the merchant and comprising information confirming the authorization of the transaction;

computer-executable program instructions to provide the authorization indicator to the application operating on the user computing device for the user to display to the merchant system operator to confirm authorization of the transaction.

15. The computer program product of claim 14, wherein determining whether to authorize the purchase transaction request comprises verifying the financial account of the user.

16. The computer program product of claim 14, wherein the authorization indicator comprises one or more of a password, code, phrase, picture, photograph, or number.

17. The computer program product of claim 14, wherein the merchant operator identification code is stored with a plurality of merchant operators of the merchant.

18. The computer program product of claim 14, wherein the merchant operator identification code of the purchase transaction request is obtained by the user computing device via by scanning the QR code, receiving a near-field communication, or receiving a radio-frequency identification.

* * * * *